Witness
E. O. Jacker

Inventor:
Stewart Brown
By Charles Turner Brown
Att'y

UNITED STATES PATENT OFFICE.

STEWART BROWN, OF CHICAGO, ILLINOIS.

GARAGE.

1,175,506.   Specification of Letters Patent.   Patented Mar. 14, 1916.

Application filed August 6, 1915. Serial No. 44,112.

*To all whom it may concern:*

Be it known that I, STEWART BROWN, a citizen of the United States, and a resident of Chicago, in the county of Cook and State of Illinois, have invented certain new and useful Improvements in Garages, of which the following is a specification.

This invention relates to buildings used for the storage of automobiles and other large vehicles.

The object of the invention is to obtain a building which may be placed on or near to the line of an alley or narrow street, on a common city lot, and into which an automobile or other vehicle of greater length than the width of said alley or street can be easily placed.

A further object is to obtain a building from which an automobile or other heavy vehicle can be readily taken and put on the alley, or narrow street, by one authorized to so do, but from which, when the same is closed, as herein set forth, the removal of the automobile or other vehicle will be difficult to effect.

A further object is to obtain a building which will present to a person elsewhere on said lot, a view of the removal of an automobile or other vehicle therefrom; or at least a view of the preparations which must be made to effect said removal.

Figure 1:
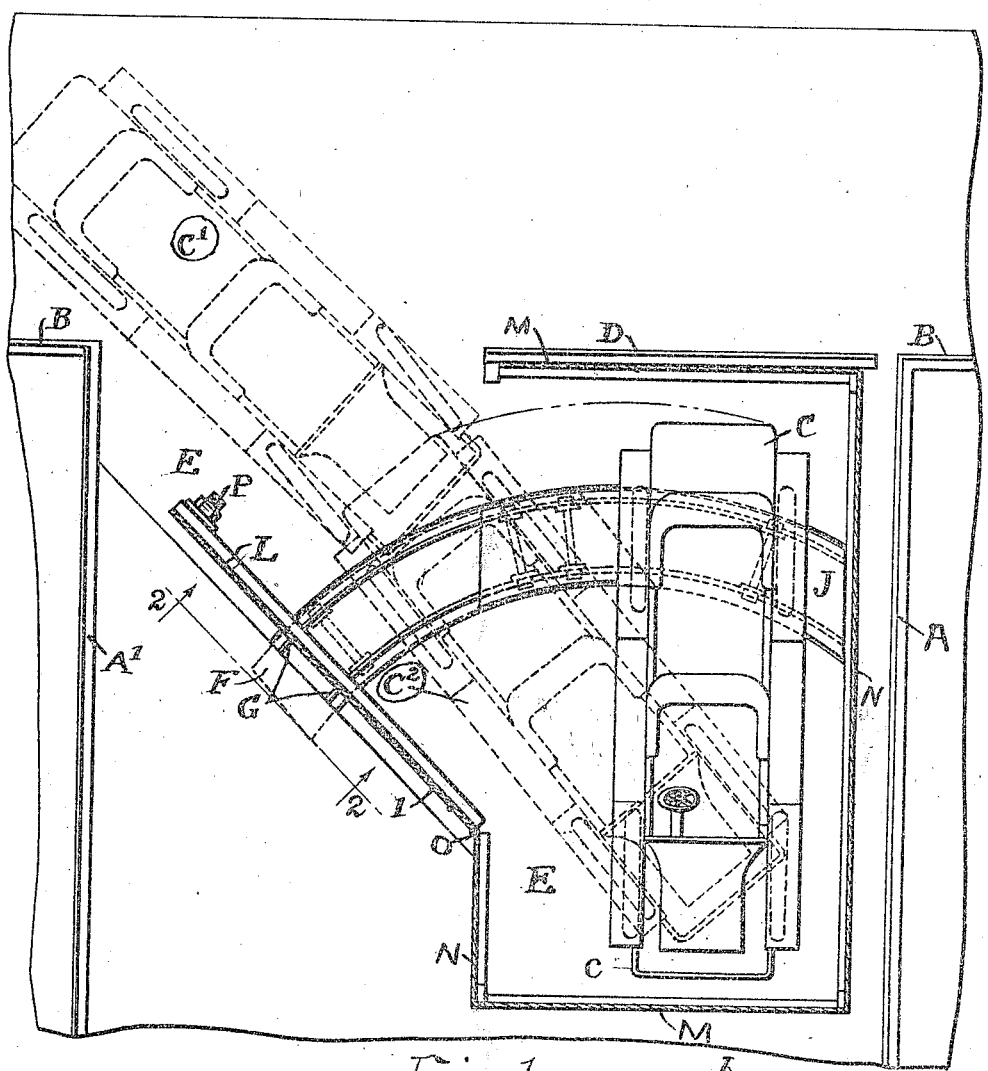
Figure 3:
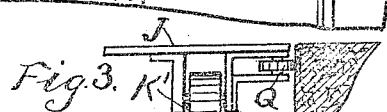
Figure 2:
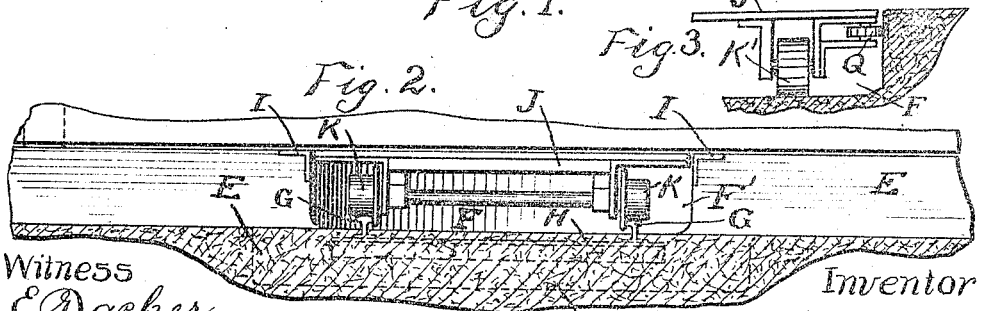

In the drawing accompanying and forming a part of this specification Figure 1 is a horizontal section of a garage embodying this invention; Fig. 2 is a vertical section on line 2—2 of Fig. 1, viewed in the direction indicated by the arrows. Fig. 3 is a modified means of guiding the truck of the device.

To those familiar with the housing of automobiles it is known that where the total length of the machine exceeds the width of the alley or street on which a garage is located it is difficult to effect an entrance to said garage, unless the doorway greatly exceeds the width of said machine, or is set back from the alley line. And it is also known to those familiar with the erection of garages that it is often desirable to have a garage occupy as little as possible of a lot; and to be placed with one side, or end, thereof close to or upon the alley line of the lot; and that where the length of the machine which is to be housed exceeds the width of the alley the distance back from the alley line which it is necessary to place garages, as the same have been heretofore constructed, is considerable.

In the drawing I have illustrated a garage of approximately a width equal to one half of the width of the lot on which it is erected; and with one end thereof near to the alley line of said lot; and with the length thereof slightly in excess of an automobile which may be housed therein.

A reference character applied to designate a given part is used to indicate said part throughout the several figures, wherever the same appears.

A, A$^1$, are lot line fences; B illustrates an alley fence; and C an automobile.

C$^1$, C$^2$, are broken lines indicating the positions in which an automobile may be placed in housing an automobile in the garage; or in removing it from said garage.

D is a movable portion of the alley fence; and said movable portion constitutes a gate.

E is a bed, which forms the floor of the garage and a platform outside of the garage. Said bed is substantially as wide as is the lot on which the garage is located, at the alley line; and is as wide as the garage on the end thereof which is parallel with the alley line. Bed E is preferably made of Portland cement and sand, with broken stone, in the ordinary way of making concrete foundations and beds, but I do not, of course, confine myself to the material of which said bed E is constructed; as it may be made of wood; or if the level of the lot is the same or higher than the grade of the alley it may be of earth, or cinders.

F is a depression in bed E, and G indicates rails in depression F. In constructing the garage embodying this invention the rails G are tied together, and bent into suitable curves before being laid. H, (Fig. 2), being broken lines indicating a cross tie binding said rails G together. Said cross ties, and if desired a portion of said rails, are embedded in the material forming the bottom of the depressed portion of bed E.

I indicates angle irons curved to correspond with the curve of the sides of the depression F; and said sides F' are curved to correspond with the curve of the tracks G.

J is a truck, the sides whereof are curved to correspond with the curve of the sides of depression F.

K indicates the flanged wheels which rest on tracks G and support the truck J. The length of truck J is such that when the same is in the position which is indicated by broken lines in Fig. 1, it will extend to near the door (L) of the garage, or underneath the same, and so far into the garage that the wheels on the left hand side of a person in the driver's seat of automobile C will not run over the end thereof and into depression F while the car is being run into the positions which are indicated by broken lines $C^1$, $C^2$.

1 is a small door, in door L.

M indicates the end walls of the garage, and N the side walls thereof. It will be observed that door L forms a part of one of the sides N of the garage and is attached to said side by the hinge O.

P is a roller which supports one end of the door L.

Door L is of sufficient width to permit the automobile or other vehicle which is to be housed in the garage to be driven from the alley on to the platform formed by bed E on substantially the course indicated by broken lines $C^1$, with the rear wheels of the automobile on the truck J. The truck J is then pushed on the tracks G from the position in which said truck is indicated by broken lines in Fig. 1, into the position in which it is illustrated by full lines (lettered C) in said figure. It will be found that when the truck J is moved on tracks G, as stated, the front wheels of the automobile, or other vehicle, being free to roll on bed E, and the brake of the machine being "on" to lock the rear wheels on the platform or truck J, that said automobile, or other vehicle, will assume, from the position indicated by said broken lines $C^2$, the position illustrated by the full lines C. Door L is then closed, and also gate D.

To remove the automobile from the garage the portion of the alley fence D (forming a gate) is moved into the position in which it is illustrated by full lines in Fig. 1, the door L is opened; the truck J moved from the position in which it is illustrated in full lines to the position, (or substantially so) in which it is indicated by broken lines; the engine of the automobile started and the machine backed into the alley.

In the modification illustrated in Fig. 3 a flangeless wheel $K^1$ is substituted for the wheels K; and the roller Q (one at each corner of the truck) for the track G. The operation of this modified construction is the same as above described, except that the angle irons I form the tracks of the several rollers Q, and the bottom of the depressed portion F, of the floor forms the runway for wheels $K^1$, thus guiding the truck J in said depressed portion.

I claim;

1. A garage for housing vehicles, comprising walls, one whereof is substantially parallel with a traveled way, a door in one of the walls which are at right angles to said parallel wall, a floor within said walls and extending beyond the wall which is provided with a door, a depression in said floor, said depression extending across the opening which is closed by said door and across the portion of said floor which extends beyond said door, and tracks in said depression, in combination with a truck provided with wheels, said wheels adapted to run on said tracks.

2. A garage for housing vehicles, comprising walls, a door in one of said walls, and a concrete floor provided with a depression extending across the opening which is closed by said door, a concrete floor outside said garage walls and substantially level with the floor within said walls, said depression extending into said outside floor, and tracks in said depression, in combination with angle irons extending along the upper edges of said depression, and a truck provided with wheels adapted to travel on said tracks, the upper face of said truck being substantially in the same plane as the upper face of said floor.

3. A garage for housing vehicles, comprising walls arranged to form a rectangle, two of said walls parallel to a traveled way, and comprising a floor extending beyond the wall which is at right angles to said parallel walls and on one side of said garage, a door in said last named wall, a curved depressed portion to said floor extending through the opening which is closed by said door, and tracks in said depressed portion of the floor, said tracks curved to correspond with the curves of the side walls of said depressed portion of the floor, in combination with a truck, wheels on said truck adapted to travel on said tracks, and a movable gate adapted when in one position to obstruct the admission of a vehicle to said floor, and when in a different determined position to admit said vehicle to said floor.

4. A garage for housing vehicles, comprising walls arranged to form a rectangle, two of said walls parallel to a traveled way and comprising a floor extending beyond one of the walls which are at right angles to said traveled way, a door in said last named wall, a curved depressed portion in said floor extending through the opening which is closed by said door, in combination with angle irons extending along the upper edges of said depressed portion, a truck provided with wheels adapted to travel along said depressed portion of said floor, and means to guide said truck.

STEWART BROWN.

In the presence of—
CHARLES TURNER BROWN,
M. R. WINCHELL.